Patented Dec. 15, 1925.

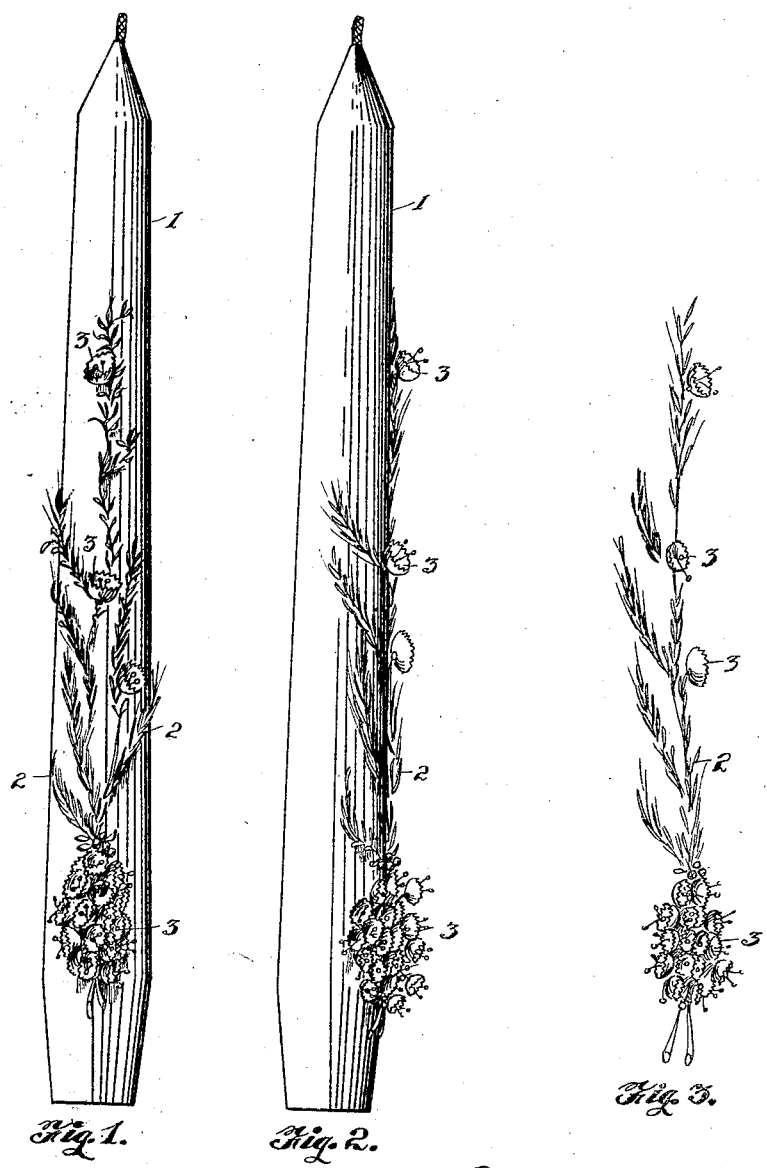

1,565,242

UNITED STATES PATENT OFFICE.

MABEL F. ALKIRE, OF DALLAS, TEXAS.

METHOD OF DECORATING ART NOVELTIES.

Application filed October 1, 1925. Serial No. 59,898.

*To all whom it may concern:*

Be it known that I, MABEL F. ALKIRE, a citizen of the United States, residing at Dallas, in the county of Dallas and State of Texas, have invented certain new and useful Improvements in Methods of Decorating Art Novelties, of which the following is a specification.

This invention relates to a method of decorating art novelties and it refers more particularly to the method of decorating ornamental candles, vases and other analogous ornamental articles, such method having for its primary object an embellishment for articles of the character designated of natural appearance and lasting pulchritude.

The invention further contemplates the provision of an embellishment for articles as set forth, which in view of its normally imperishable nature, renders the article to which the same is applied comparatively easy to ship and otherwise handle without affecting its original beauty and luster.

With the foregoing in view, the invention has particular reference to the method of applying the embellishments to attain the objects aforesaid, as well as to enhance the general appearance and sale of the articles to which the said embellishments are applied, an example of which will be described in the course of the following detail description and illustrated in the accompanying drawing, wherein:

Figure 1 illustrates for an example a candle upon which the decorative effect is attained by the application of the embellishments as set forth by the invention.

Figure 2 is a side elevational view thereof, and

Figure 3 shows a detail view of the embellishment prior to the application thereof to the article.

In proceeding with the present invention, attention is directed to the drawings which illustrate an example as to the application of the invention, employing for a subject a wax or tallow candle of the usual form, and which is illustrated by the numeral 1. It will become apparent however, as the description proceeds that other articles such as flower vases, candle sticks, perfume bottles and the like may be as readily decorated by the application of the present method of decorating without departing from the principle adhered to throughout.

A quantity of weeds, grass or other slight vegetable growth 2 in a dried state is procured which is adhered to the article in a position illustrated in Figures 1 and 2 to suit the requirements of the article as to height and width, by heating a quantity of paraffine or other transparent waxy substance to attain a liquid consistency, whereupon the same is dripped upon the grass at spaced intervals to substantially affix the latter to the article.

After the foregoing is accomplished, a mixture of varnish and quick silver, gilt paint or other suitable pigment is composed and a coating thereof applied to the grass, to harmonize with the component color of the article to which it is applied to produce an artistic and natural effect, whereupon a number of cloth or linen flowers are applied in bunches or at spaced intervals upon the grass in the same manner employed in adhering the grass to the article, in such a manner as to denote natural placement of the said flowers upon the grass, as depicted in the drawings. It is also obvious that other equivalent ornamental objects may be substituted for those described in the foregoing without deviating from the process employed throughout in the practice of the invention.

It is well known to be an established practice in the art of decorating plastic or articles of glass, such as candles, vases or perfume bottles, to form the embellishments of the substance of which the article is composed to form an integral part thereof. Ornamental candles decorated in this manner have been found to lose their original luster and beauty by breaking off or otherwise injuring the embellishments by heat or handling, and further, renders successful shipping of the articles very difficult.

The present invention aims to obviate the foregoing disadvantage, as well as to provide a natural and lasting ornamental effect, by producing comparatively indestructible embellishments of natural growth, which retain their intended pulchritude and stability irrespective of shipping.

What I claim and desire to secure by Letters Patent is:

1. The hereindescribed method of decorating plastic articles which consists initially in adhering tufts of natural grass to the said article by heating a quantity of paraffine to a liquid consistency and dripping the same at spaced intervals on said grass, then in affixing a number of cloth flowers at desired positions on said grass to indicate natural placement thereof, and finally in varnishing said grass to produce a natural effect.

2. The hereindescribed method of producing an embellishment for articles such as candles, perfume bottles and the like, which consists initially in selecting tufts of grass in a dried state and adhering the same to the body of the article by melting a quantity of transparent waxy substance and distributing the same along the contacting edges of said grass tufts, then in affixing a series of artificially prepared flowers to said grass to produce a natural effect, and finally in coating the said grass with a mixture of varnish and colored pigment.

3. The hereindescribed method of producing an embellishment for candles, vases and the like, which consists in adhering to the object a quantity of natural grass in a dehydrated state by dropping thereon portions of heated paraffine, then in affixing to said grass a plurality of cloth flowers, then in dropping thereon quantities of melted paraffine to maintain relief effect of said flowers, and finally in coating said grass with a mixture of varnish and suitable pigment.

In testimony whereof I affix my signature.

MABEL F. ALKIRE.